April 19, 1932.    J. WAHL ET AL    1,854,913
PRESSURE GAUGE
Filed Oct. 20, 1928

INVENTORS:
John Wahl and
Otto Melzer,
By Attorneys,
Fraser, Myers & Manley

Patented Apr. 19, 1932

1,854,913

UNITED STATES PATENT OFFICE

JOHN WAHL, OF ROSEDALE, AND OTTO MELZER, OF HOLLIS, NEW YORK, ASSIGNORS TO A. SCHRADER'S SON, INC., OF BROOKLYN, NEW YORK, A CORPORATION OF NEW YORK

PRESSURE GAUGE

Application filed October 20, 1928. Serial No. 313,698.

This invention relates to pressure gauges of the dial type, particularly adapted for use in gauging pneumatic tire pressures, and aims to provide certain improvements therein.

The object of the present invention is to simplify and improve the construction of such gauges and to reduce their manufacturing cost.

A further object of the invention is to provide a gauge of the type described, especially adapted for gauging the lower pressures used in balloon tires, the dial of said gauge having larger divisions between the pressure indicia, thereby rendering the gauge more accurate and its reading more facile.

The foregoing and other objects of the invention we accomplish by providing in a dial gauge a pressure-operated rack-bar and pinion, means for temporarily holding the rack in the position to which it is moved by the operating pressure, and means for manually moving the rack to reset the indicator to its zero position. The invention also embodies other features of novelty which will be hereinafter more fully described.

A preferred embodiment of our invention is illustrated in the accompanying drawings wherein, Figure 1 is a front elevation of a dial gauge embodying our invention.

Figure 1:
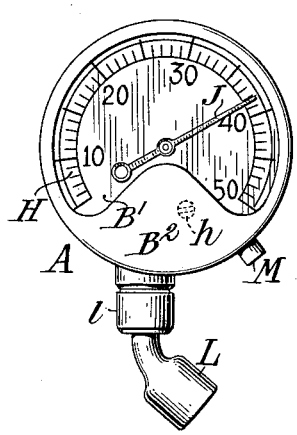

Referring to the drawings let A indicate the gauge as a whole, comprising a substantially cylindrical casing B having mounted within it a block C which houses a piston D, a rack-bar E, a pinion F and a coiled spring G which presses against the piston D, a dial H over which is movable a pointer J mounted on the pinion shaft, a rack-bar resetting means indicated generally by the letter K, and a tire valve press-on foot L.

The casing B is of cup shape provided with an opening in its cylindrical wall through which a cylindrical projection $c$ at the foot of the block C extends. A second opening is provided in the cylindrical wall of the casing, through which opening extends the reduced portion of a headed member M, the function for which will presently appear.

The block C is secured within the casing B through the medium of screws $b$, $b$ extending through the back of the casing, and is provided with an opening $c'$ extending longitudinally of the block and substantially radially of the casing. The opening $c'$ is of a diameter to snugly permit the piston to move therein and is formed near its top with a shoulder $c^2$, against which one end of the spring G bears. At its top the block C is provided with a groove or recess $c^3$, within which is mounted at one side of the rack-bar and in mesh therewith the pinion F, which, in turn, is supported upon the pin $f$. Within said groove $c^3$ upon the opposite side of the rack E, there is mounted a friction roller N carried upon a pin $n$, the opposite ends of which are received in slots $c^4$ formed in the walls at the top of the block C traversed by the recess $c^3$. The lower end $c$ of the block is externally threaded and receives a flanged sleeve $l$ which serves to couple the curved press-on foot L to the block C. The specific construction of the press-on foot L and the manner in which it is secured to the gauge may be of any approved form.

The piston D is snugly movable within the opening $c'$ in block C and is normally held in its lowermost position by the spring G acting thereagainst, and it may have any approved construction. Preferably, however, it is formed with a projection $d$ at its underside which may serve as a stop, and with an axial projection $d'$ on its upper side, for a purpose which will presently appear.

The rack-bar E extends into the opening $c'$ in the block C and is formed at its inner end with an internally screw-threaded socket $e$, within which is adjustably mounted a set screw $e'$ adapted to be held in set position by a coil spring $e^2$. In normal or zero indicating position of the gauge the head of the screw $e'$ rests in contact with the top of the projection $d'$ on the piston. The back of the rack-bar is preferably curved to fit the concaved groove $n'$ in the roller N, which roller is held in rolling frictional engagement with the rack-bar through the medium of a wire spring $n^2$ extending through an opening $c^5$ in the block C and anchored between said block and the casing.

The dial H is mounted over the pin $f$ and secured against one face of the block C through the medium of a screw $h$ or other suitable means. The pointer J is frictionally secured on the pin F to move over the face of the dial J in a conventional manner. To protect the pointer and suitably enclose the gauge mechanism, the front of the gauge casing is covered with a suitable transparent disk B', which disk is held in place by a suitable bezel $B^2$.

The rack-bar resetting means indicated generally by the letter K comprises a pivoted lever O, a bent wire spring P and the headed member M. The lever O is pivotally mounted upon a block $o$ which is secured to the rear of the casing B by a screw $o'$. This lever O is normally held out of engagement with the rack-bar by the spring P, one end of which is secured to the lever and the other end of which is anchored between the casing and a recess $c^6$ formed in the base of the block C. Said spring P is substantially L-shaped in form and is provided with a convolution or loop $p$ adjacent its end which is anchored in the block C so as to provide proper tension on the lever O. The arm of the L which is provided with the loop $p$ normally presses against and is seated within a kerf $m$ in the head of the member M.

Figure 2:
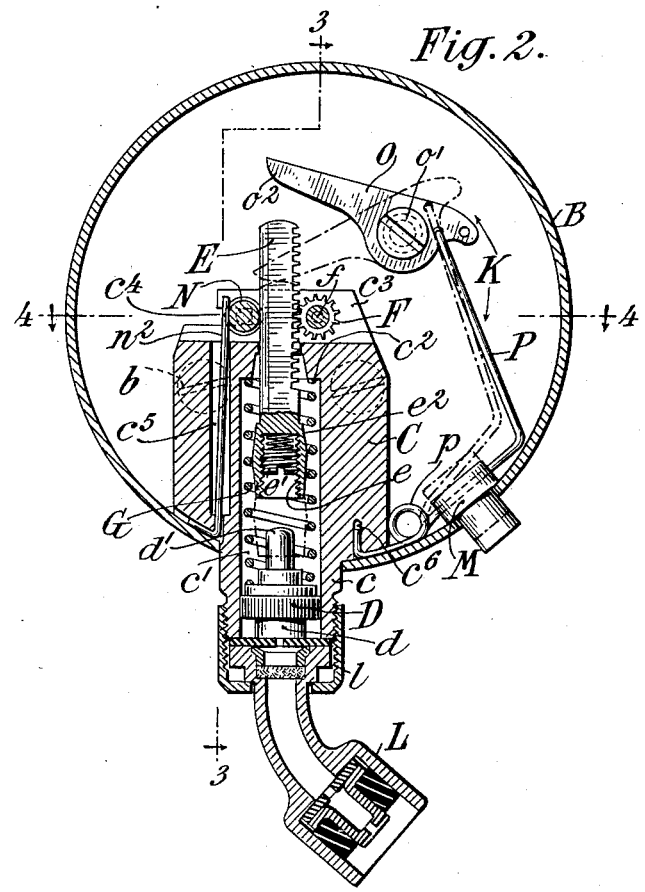
Fig. 2 is a section of the gauge taken on a plane passing approximately midway between the front and back of the casing.
Figure 3:
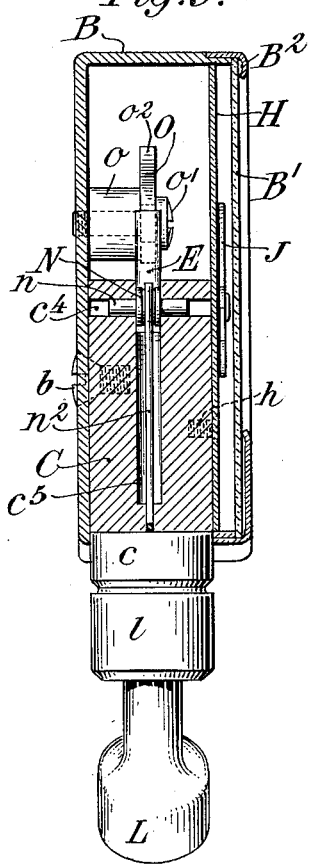
Fig. 3 is a section taken substantially along the planes of the line 3—3 of Fig. 2.
Figure 4:
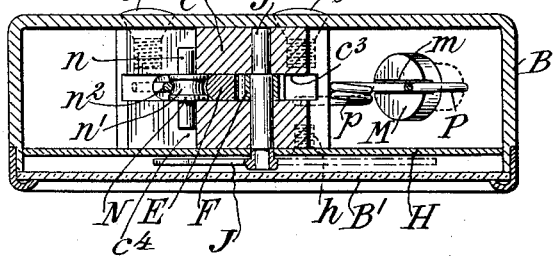
Fig. 4 is a diametrical section taken substantially along the plane of the line 4—4 of Fig. 2.

From the foregoing description it will be apparent that in the use of the gauge, when the press-on foot L is pressed against a tire valve, opening the same, some air from the tire will pass up and act against the underside of the piston D which will in turn move the rack-bar upwardly. The movement of the rack-bar will rotate the pinion F, and in consequence thereof will move the pointer J over the dial H to indicate the pressure. When the pressure against the underside of the piston is withdrawn the spring G will return the piston D to its zero position, but in view of the frictional engagement of the roller N with the back of the rack-bar E, said rack-bar and pointer will be held in the position to which they have been moved, so that the gauge reading may be made at a point remote from the tire. To reset the rack-bar and pointer to their zero positions, it is merely necessary to press inwardly against the end of the member M, which will move the spring P and lever O from their full line position to their dot and dash line position indicated in Fig. 2, during which movement the end $o^2$ of the lever O will engage the top of the rack-bar and move it inwardly into the opening $c'$. Upon release of the button M the lever and spring will again assume the full line positions.

If after the assembly of the gauge, or at any time subsequent thereto it is found that upon resetting the rack-bar through the medium of resetting means K, that the pointer J does not coincide with the zero on the dial, this can be remedied by adjustment of the set screw $e'$.

The gauge as thus constructed, as will be apparent, contains but few parts, may be quickly and cheaply assembled, and through the employment of a suitable spring and length of rack-bar the divisions on the dial can be made suitably large so as to greatly facilitate the accurate reading of the indicated pressures.

While we have shown and described a preferred embodiment of our invention we do not wish to be limited to the precise construction disclosed, since modifications thereof may be resorted to without departing from the spirit of the invention.

What we claim is:

1. A tire pressure gauge of the dial type, comprising pressure-responsive means, a rack-bar unconnected to but movable by said means in one direction, a pinion in mesh with said rack-bar and frictional means in rolling contact with the back of said rack-bar and adapted to hold it in any position to which it is moved by the pressure-responsive means after said means have returned to zero position.

2. A tire pressure gauge of the dial type, comprising pressure-responsive means, a rack-bar unconnected to but movable by said means in one direction, a pinion in mesh with said rack-bar, and a spring-pressed roller in contact with the back of said rack-bar to hold said rack-bar in any position to which it is moved by the pressure-responsive means after said means have returned to zero position.

3. A tire pressure gauge of the dial type, comprising a closed casing having within it pressure-responsive means, a rack-bar movable by said means, means for holding the rack-bar in any position to which it is moved by the pressure-responsive member, and means operable from the exterior of the casing adapted to engage the rack near its top and move it to its normal position.

4. A tire pressure gauge of the dial type, comprising a closed casing having within it pressure-responsive means, a rack-bar movable by said means, means for holding the rack-bar in any position to which it is moved by the pressure-responsive member, a pivoted lever independent of the rack bar within the casing adapted to be moved to engage the rack-bar to move it to its normal position, and means projecting through the casing and operable from the exterior thereof for moving said lever.

5. A tire pressure gauge of the dial type, comprising a closed casing having within it pressure-responsive means, a rack-bar movable by said means, means for holding the rack-bar in any position to which it is moved by the pressure-responsive member, a pivoted lever within the casing adapted to be moved about its pivot to engage the rack-bar, spring means for normally holding said lever out of contact with said rack-bar, and means operable from the exterior of the casing for overcoming the tension of the spring means for moving the lever about its pivot.

6. A tire pressure gauge of the dial type, comprising a casing, a block having recesses mounted within said casing, a plunger, a rack and pinion in mesh with one another, frictional means for engaging the rack, and a spring normally opposing movement of the plunger, all mounted within the recesses in said block, the plunger being adapted, under the influence of fluid pressure acting in opposition to the spring, to move the rack, and means within the casing operable from the exterior thereof for returning the rack to its normal position after it has been moved by the plunger.

7. A tire pressure gauge of the dial type, comprising a casing, a block within said casing having an opening within which is mounted a piston, a spring pressing against said piston and a rack-bar unconnected to but movable by said piston outwardly through said opening, a pinion in mesh with the teeth of the rack and a friction means in sliding contact with a side of the rack, said pinion and friction means being supported by the block, and spring-controlled means operable from the exterior of the casing for moving the rack-bar into the opening in the block when it is extended through said opening.

8. A tire pressure gauge of the dial type, comprising a casing, a block within said casing having an opening within which is mounted a piston, a spring pressing against said piston and a rack-bar unconnected to but movable by said piston outwardly through said opening, a pinion in mesh with the teeth of the rack and a friction means in sliding contact with a side of the rack, a spring pressing against said friction means, said pinion and friction means being supported by the block, and spring-controlled means operable from the exterior of the casing for moving the rack-bar into the opening in the block when it is extended through said opening, the spring which presses against the friction means and the spring which controls the rack-moving means being anchored to said block.

In witness whereof, we have hereunto signed our names.

JOHN WAHL.
OTTO MELZER.